United States Patent [19]

Okamoto et al.

[11] Patent Number: 5,608,533
[45] Date of Patent: Mar. 4, 1997

[54] VIDEO SIGNAL RECORDING/REPRODUCING APPARATUS WHERE THE ORDER OF ACCESS TO VIDEO DATA DURING A WRITE MODE IS DIFFERENT THAN THE ORDER OF ACCESS DURING A READ MODE

[75] Inventors: Manabu Okamoto; Noriyoshi Takeya, both of Tokorozawa, Japan

[73] Assignee: Pioneer Electronic Corporation, Tokyo, Japan

[21] Appl. No.: 114,396

[22] Filed: Sep. 1, 1993

[30] Foreign Application Priority Data

Sep. 2, 1992 [JP] Japan ................................. 4-234877
Jul. 23, 1993 [JP] Japan ................................. 5-182914

[51] Int. Cl.$^6$ ................................................ H04N 5/76
[52] U.S. Cl. ........................................... 386/91; 386/19
[58] Field of Search ................................ 358/335, 310, 358/337, 339, 320; 348/460, 420; 380/5, 10, 20; 360/33.1; H04N 5/76

[56] References Cited

U.S. PATENT DOCUMENTS 4,575,754  3/1986  Bar-Zohar ........................ 348/420
5,204,787  4/1993  Suzuki et al. ..................... 358/337
5,303,294  4/1994  Kimoto et al. .................... 358/335
5,335,275  8/1994  Millar et al. ...................... 380/20

FOREIGN PATENT DOCUMENTS 0325509  7/1989  European Pat. Off. .
0356200  2/1990  European Pat. Off. .
2067871  7/1981  United Kingdom .

*Primary Examiner*—Thai Q. Tran
*Assistant Examiner*—Huy Nguyen
*Attorney, Agent, or Firm*—Sughrue, Mion, Zinn, Macpeak & Seas

[57] ABSTRACT

A video signal recording apparatus digitizes video signals, writes the digital data in a memory and then reads them therefrom before recording the video signals on a recording medium. The orders of access to the addresses in the memory in write and read modes differ from each other with a predetermined relationship. A video signal reproducing apparatus reads recorded video signals from a recording medium, digitizes the video signals, writes the digital data in a memory and then reads them therefrom. The orders of access to the addresses in the memory in write and read modes differ from each other with a predetermined relationship.

2 Claims, 12 Drawing Sheets

Fig. 3

| X\Y | 0 | 1 | 2 | --- | 909 |
|---|---|---|---|---|---|
| 0 | [1,1] | [1,2] | [1,3] | --- | [1,910] |
| 1 | [172,1] | [172,2] | [172,3] | --- | [172,910] |
| 2 | [87,1] | [87,2] | [87,3] | --- | [87,910] |
| 3 | [2,1] | [2,2] | [2,3] | --- | [2,910] |
| 4 | [173,1] | [173,2] | [173,3] | --- | [173,910] |
| --- | --- | --- | --- | --- | --- |
| 255 | [86,1] | [86,2] | [86,3] | --- | [86,910] |

Fig. 10

| BLOCK No. | X \ Y | 0 | 1 | 2 | ...... | 909 |
|---|---|---|---|---|---|---|
| 1 | 0 | [1, 1] | [1, 2] | [1, 3] | ...... | [1, 910] |
| | 1 | [4, 1] | [4, 2] | [4, 3] | ...... | [4, 910] |
| | 2 | [7, 1] | [7, 2] | [7, 3] | ...... | [7, 910] |
| | 3 | [2, 1] | [2, 2] | [2, 3] | ...... | [2, 910] |
| | 4 | [5, 1] | [5, 2] | [5, 3] | ...... | [5, 910] |
| | 5 | [8, 1] | [8, 2] | [8, 3] | ...... | [8, 910] |
| | 6 | [3, 1] | [3, 2] | [3, 3] | ...... | [3, 910] |
| | 7 | [6, 1] | [6, 2] | [6, 3] | ...... | [6, 910] |
| | 8 | [9, 1] | [9, 2] | [9, 3] | ...... | [9, 910] |
| 2 | 9 | [10, 1] | [10, 2] | [10, 3] | ...... | [10, 910] |
| | 10 | [13, 1] | [13, 2] | [13, 3] | ...... | [13, 910] |
| | 11 | [16, 1] | [16, 2] | [16, 3] | ...... | [16, 910] |
| ⋮ | ⋮ | ⋮ | ⋮ | ⋮ | ...... | ⋮ |
| ⋮ | ⋮ | ⋮ | ⋮ | ⋮ | ...... | ⋮ |
| 29 | 252 | [253, 1] | [253, 2] | [253, 3] | ...... | [253, 910] |
| | 253 | [256, 1] | [256, 2] | [256, 3] | ...... | [256, 910] |
| | 254 | [255, 1] | [255, 2] | [255, 3] | ...... | [255, 910] |
| | 255 | [254, 1] | [254, 2] | [254, 3] | ...... | [254, 910] |

VIDEO SIGNAL RECORDING/REPRODUCING APPARATUS WHERE THE ORDER OF ACCESS TO VIDEO DATA DURING A WRITE MODE IS DIFFERENT THAN THE ORDER OF ACCESS DURING A READ MODE

BACKGROUND OF THE INVENTION

1. Field of the Invention

The present invention relates to a recording apparatus for recording video signals on a recording medium, such as a disk, and a reproducing apparatus for reproducing the video signals therefrom.

2. Description of the Related Art

It is known that there are a video disk player and a video tape recorder as conventional apparatuses for reproducing video signals recorded on a recording medium. For instance, the video disk player reproduces video signals recorded on a disk as long as the disk has been prepared in a predetermined video disk format.

In some cases, it would be inconvenient if all the recorded images were allowed to be reproduced arbitrarily at the time a video disk is played. For example, some educational videos and video games are designed to change the progress of videos in accordance with the manipulation of users, so that if the users can easily find answers to questions or key points of each game, the value of each software is reduced or such videos become insignificant to the users.

SUMMARY OF THE INVENTION

It is therefore an object of the present invention to provide a video signal recording apparatus and a video signal reproducing apparatus which do not allow accurate arbitrary reproduction of recorded video images from a recording medium.

To achieve the foregoing object, according to one aspect of the present invention, there is provided a video signal recording apparatus comprising a memory having a capacity for storing at least one field of digital video signals; write/read control means for writing digital video signals into the memory and reading written digital video signals therefrom; and recording means for recording record signals corresponding to read digital video signals, on a recording medium, whereby an order of access of the write/read control means to addresses in the memory in write mode and an order of access of the write/read control means to the addresses in the memory in read mode differ from each other with a predetermined relationship.

According to the video signal recording apparatus of this invention, video signals are digitized, are written in the memory and are then read therefrom before being recorded on a recording medium, and the orders of access to the addresses in the memory in write and read modes differ from each other with a predetermined relationship.

According to another aspect of this invention, there is provided a video signal reproducing apparatus comprising read means for reading recorded signals carrying video signals from a recording medium; signal generating means for generating digital video signals in accordance with the read recorded signals; a memory having a capacity for storing at least one field of digital video signals; and write/read control means for writing produced digital video signals in the memory and reading written digital video signals therefrom, whereby an order of access of the write/read control means to addresses in the memory in write mode and an order of access of the write/read control means to the addresses in the memory in read mode differ from each other with a predetermined relationship.

According to the video signal reproducing apparatus of this invention, after recorded signals are read from a recording medium, yielding video signals, the video signals are digitized, are written in the memory and are then read therefrom, and the orders of access to the addresses in the memory in write and read modes differ from each other with a predetermined relationship.

BRIEF DESCRIPTION OF THE DRAWINGS

FIG. 3 is a diagram showing how video data is recorded in a field memory in the apparatus shown in FIG. 1;

FIG. 10 is a diagram showing how video data is recorded in a field memory in the apparatus shown in FIG. 8;

DETAILED DESCRIPTION OF THE PREFERRED EMBODIMENTS

Preferred embodiments of the present invention will now be described referring to the accompanying drawings.

Figure 1:
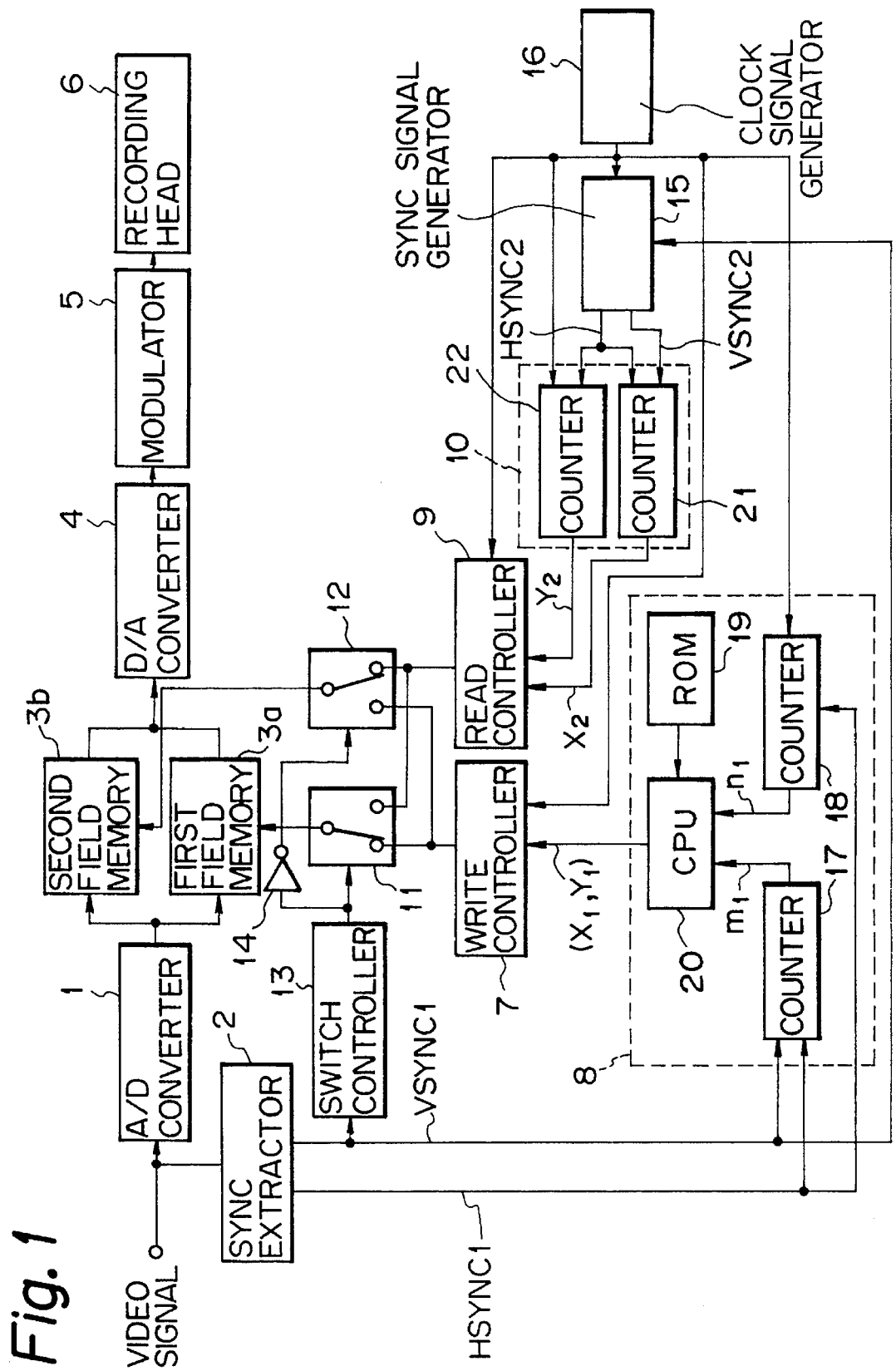
FIG. 1 is a block diagram illustrating a video signal recording apparatus according to one embodiment of the present invention.

As shown in FIG. 1, in a video signal recording apparatus embodying the present invention, an A/D converter 1 and a sync extractor 2 are connected to an input terminal to which video signals of the NTSC system to be recorded are supplied. First and second field memories 3a and 3b are connected to the output of the A/D converter 1. The field memories 3a and 3b are so designed that 910 (horizontal direction) ×256 (vertical direction) =232,960 samples, eight bits per sample, can be written in or read from those memories 3a and 3b. A D/A converter 4 is connected to the outputs of the field memories 3a and 3b. The output of the D/A converter 4 is connected to a modulator 5 which provides modulated video signals to be recorded on a disk (not shown). The modulated video signals are supplied to a recording head 6.

The sync extractor 2 extracts horizontal and vertical sync signals HSYNC1 and VSYNC1 from a video signal. The horizontal and vertical sync signals are supplied to a write controller 7 and a write address setting circuit 8. The write controller 7 controls the writing of video data into the first and second field memories 3a and 3b. The write address setting circuit 8 sequentially sets write addresses in the first and second field memories 3a and 3b. Reading of video data from the first and second field memories 3a and 3b is controlled by a read controller 9. The read controller 9 is connected to a read address setting circuit 10 which sequentially sets read addresses to be accessed.

One of the first and second field memories 3a and 3b is in write mode for one field period, while the other field memory is in read mode. Accordingly, switches 11 and 12 are provided between the first and second field memories 3a and 3b and the write and read controllers 7 and 9. The switching of the switches 11 and 12 is controlled by a switch controller 13. The switch controller 13 generates a switch control signal which is inverted every time the vertical sync signal is supplied from the sync extractor 2. The switch control signal is supplied directly to the switch 11, and via an invertor 14 to the switch 12.

The read address setting circuit 10 is connected to a sync signal generator 15. The sync signal generator 15 generates horizontal and vertical sync signals HSYNC2 and VSYNC2 on the basis of a clock signal output from a clock signal generator 16, and receives the vertical sync signal VSYNC1 from the sync extractor 2 as a reset signal at the time the vertical sync signal VSYNC2 is generated. The read address setting circuit 10 has two counters 21 and 22. The counter 21 is reset in accordance with the vertical sync signal VSYNC2 from the sync signal generator 15 and counts the horizontal sync signal HSYNC2 from the sync signal generator 15. The counter 22 is reset in accordance with the horizontal sync signal HSYNC2 from the sync signal generator 15 and counts the clock signal from the clock signal generator 16. The count values of the counters 21 and 22 are supplied as a read address to the read controller 9.

The write address setting circuit 8 comprises counters 17 and 18, a ROM 19 and a CPU 20. The counter 17 is reset in accordance with the vertical sync signal VSYNC1 from the sync extractor 2 and counts the horizontal sync signal HSYNC1 from the sync extractor 2. The counter 18 is reset in accordance with the horizontal sync signal HSYNC1 from the sync extractor 2 and counts the clock signal from the clock signal generator 16. An address setting program is previously written in the ROM 19. The CPU 20 runs the address setting program, and sets write addresses in accordance with the count values of the counters 17 and 18 and the clock signal during the execution of that program. This address setting will be described later in detail.

With the above structure, video signals to be recorded are converted into digital data in the A/D converter 1, and the digital data is supplied to the first and second field memories 3a and 3b sample by sample. Suppose that individual addresses (X, Y) in the first and second field memories 3a and 3b for 232,960 samples are specified by write addresses $(X_1, Y_1)$ where X is 0 to 255 and Y is 0 to 909. The switch controller 13 controls the switches 11 and 12 in such a way that in the first field of a video signal, the first field memory 3a is connected via the switch 11 to the write controller 7 and the second field memory 3b is connected via the switch 12 to the read controller 9. In other words, the first field memory 3a is in write mode while the second field memory 3b is in read mode. In the second field of the video signal, the switch controller 13 controls the switches 11 and 12 in such a way that the first field memory 3a is connected via the switch 11 to the read controller 9 and the second field memory 3b is connected via the switch 12 to the write controller 7. In other words, the first field memory 3a is in read mode while the second field memory 3b is in write mode.

Figure 2:
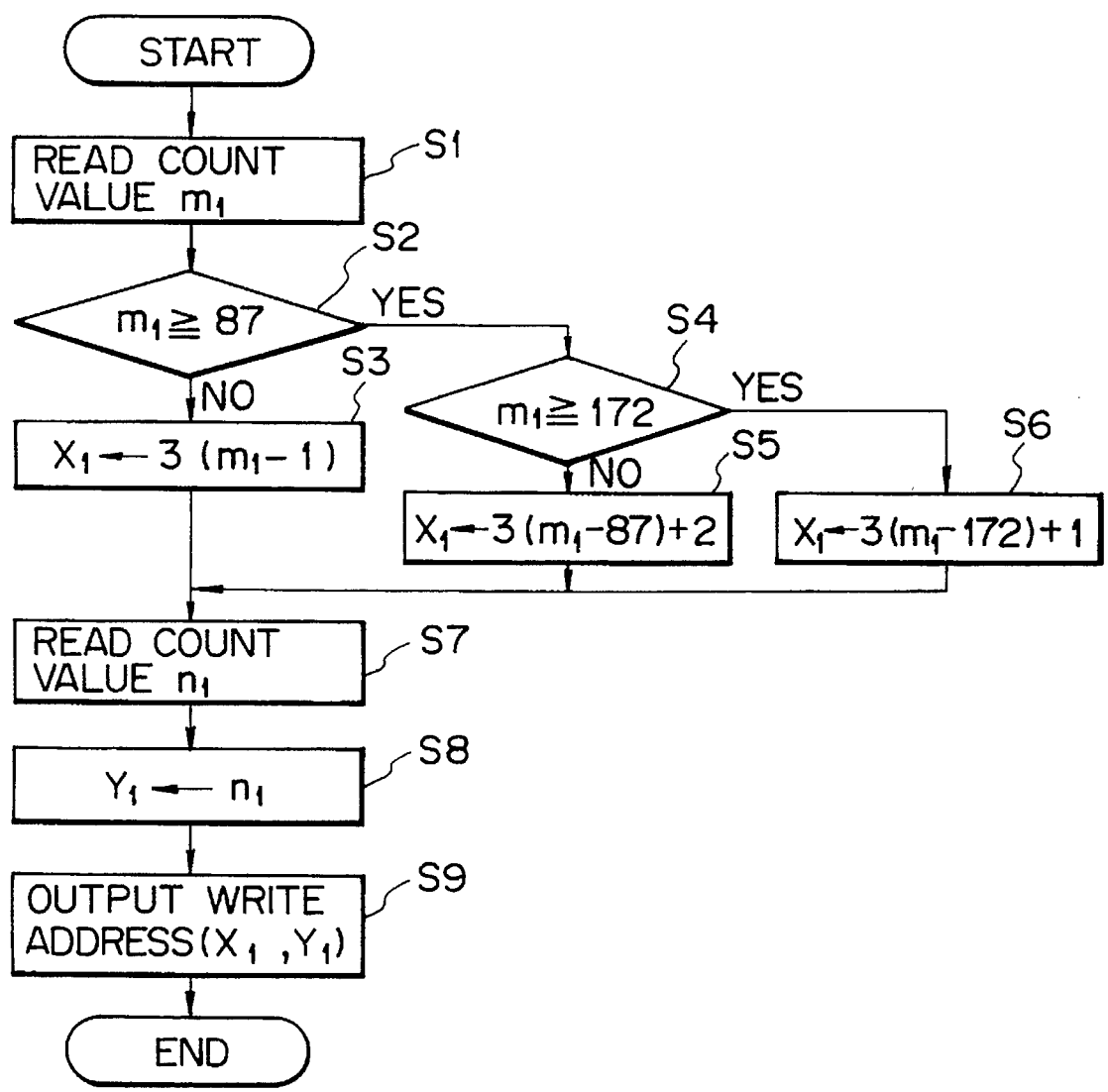
FIG. 2 is a flowchart illustrating the operation of a CPU in the apparatus shown in FIG. 1.

In the write address setting circuit 8 which sequentially supplies write addresses $(X_1, Y_1)$ to the write controller 7 at the timing synchronous with the clock signal, the value counted in the counter 17 indicates the line number $m_1$ of each field. The line number $m_1$ takes a value from 1 to 256. The value counted in the counter 18 indicates the dot number $n_1$ of each field. The dot number $n_1$ takes a value from 1 to 910. As shown in FIG. 2, the CPU 20 reads the count value $m_1$ of the counter 17 every time the clock signal is generated (step S1), and determines whether or not the count value $m_1$ is equal to or greater than 87 (step S2). When $m_1 < 87$, $X_1$ is set equal to $3(m_1-1)$ (step S3). When $m_1 \geq 87$, the CPU 20 determines if the count value $m_1$ of the counter 17 is equal to or greater than 172 (step S4). When $m_1 < 172$, $X_1$ is set equal to $3(m_1-87)+2$ (step S5). When $m_1 \geq 172$, $X_1$ is set equal to $3(m_1-172)+1$ (step S6). After the execution of step S3, S5 or S6, the CPU 20 reads the count value $n_1$ of the counter 18 (step S7) and sets $Y_1$ equal to the count value $n_1$ (step S8). Then, the CPU 20 outputs the write address $(X_1, Y_1)$ to the write controller 7 (step S9).

In the first field of a video signal, the write controller 7 writes video data at the address positions in the first field memory 3a specified by the write addresses $(X_1, Y_1)$ at the timing synchronous with the clock signal. The video data [1, 1] to [1, 910] with the line number 1 are written at the individual address positions in the first field memory 3a specified by the write addresses (0, 0) to (0, 909). The video data [2, 1] to [2, 910] with the line number 2 are written at the individual address positions in the first field memory 3a specified by the write addresses (3, 0) to (3, 909). The video data are likewise written at every third address row until the line number 86. Then, the video data [87, 1] to [87,910] with the line number 87 are written at the individual address positions in the first field memory 3a specified by the write addresses (2, 0) to (2,909). The video data [88, 1] to [88, 910] with the line number 88 are written at the individual address positions in the first field memory 3a specified by the write addresses (5, 0) to (5, 909). The video data are likewise written at every third address row for those line numbers from the number 87. The video data [172, 1] to [172,910] with the line number 172 are written at the individual address positions in the first field memory 3a specified by the write addresses (1, 0) to (1, 909). The video data [173, 1] to [173, 910] with the line number 173 are written at the individual address positions in the first field memory 3a specified by the write addresses (4, 0) to (4,909). Likewise, the video data are written at every third address row for those line numbers from the number 172. In the first field memory 3a, therefore, the video data [1, 1] to [1,910] with the line number 1 are written at the addresses (0, 0) to (0, 909), the video data [172, 1] to [172, 910] with the line number 172 are written at the addresses (1, 0) to (1, 909), and the video data [87, 1] to [87,910] with the line number 87 are written at the addresses (2, 0) to (2, 909), as shown in FIG. 3.

In the second field of the video signal, like in the first field, the write controller 7 writes video data at the address positions in the second field memory 3b specified by the write addresses $(X_1, Y_1)$ at the timing synchronous with the clock signal.

The read controller 9 reads video data from the first and second field memories 3a and 3b by a delay of nearly one field period from the writing operation. If the read addresses that are set by the read address setting circuit 10 are expressed by $(X_2, Y_2)$, $X_2$ is the count value of the counter 21 while $Y_2$ is the count value of the counter 22. As the count value of the counter 21 changes in the order of 0, 1, 2, ..., 255 and the count value of the counter 22 changes in the order of 0, 1, 2, ..., 909, the read addresses $(X_2, Y_2)$ are set like (0, 0) to (0, 909), (1, 0) to (1, 909), (2, 0) to (2, 909), and so forth in the order of the addresses in the first and second field memories 3a and 3b. In the first field of a video signal, the read controller 9 reads video data from the address positions in the first field memory 3a specified by the read addresses $(X_2, Y_2)$, at the timing synchronous with the clock signal. The video data are therefore read out in the order of the addresses, like [1, 1] to [1,910], [172, 1] to [172, 910], [87, 1] to [87,910], and so forth. In the second field of the video signal, like in the first field, the read controller 9 reads video data from the address positions in the first field memory 3a specified by the read addresses $(X_2, Y_2)$, at the timing synchronous with the clock signal.

Figure 4:
FIG. 4 is a diagram showing burst signal waveforms before writing video signals to the field memory and at the time of reading video signals therefrom.

Even if the order of the line numbers of video data to be written in the memory 3a or 3b is changed to be different from the order of the address numbers, the line numbers 1, 172, 87, 2, and so forth for reading video data from the memory 3a or 3b change in the order of an odd number, an even number, an odd number, and so forth, like the line numbers 1, 2, 3 and so forth before writing the video data into the memory 3a or 3b. As shown in FIG. 4, therefore, the phase relation between the waveform of the burst signal in the video signal corresponding to the read line number and the waveform of the burst signal in the video signal corresponding to the write line number is maintained. It is thus possible to keep the continuity of the burst signal in the video signal as defined in the NTSC system.

The thus read video data is converted into an analog video signal by the D/A converter 4. The video signal is a so-called scrambled video signal and is further sent to the modulator 5 to be a signal that is recorded on a disk. In recording the video signal together with an audio signal on the disk, the individual modulated signals are frequency-multiplexed to become a signal to be recorded.

Although video data are sequentially written in the field memories 3a and 3b in write mode in an order different from the order of the addresses of the field memories 3a and 3b in the above-described embodiment, video data may be sequentially written in the order of the addresses of the field memories 3a and 3b in write mode and may be read therefrom in an order different from the order of the addresses. No writing in the field memories is performed in the period during which the vertical sync signal is generated. If such writing is to be performed, however, the writing order should not be changed only in the duration of the generation of the vertical sync signal.

Figure 5:
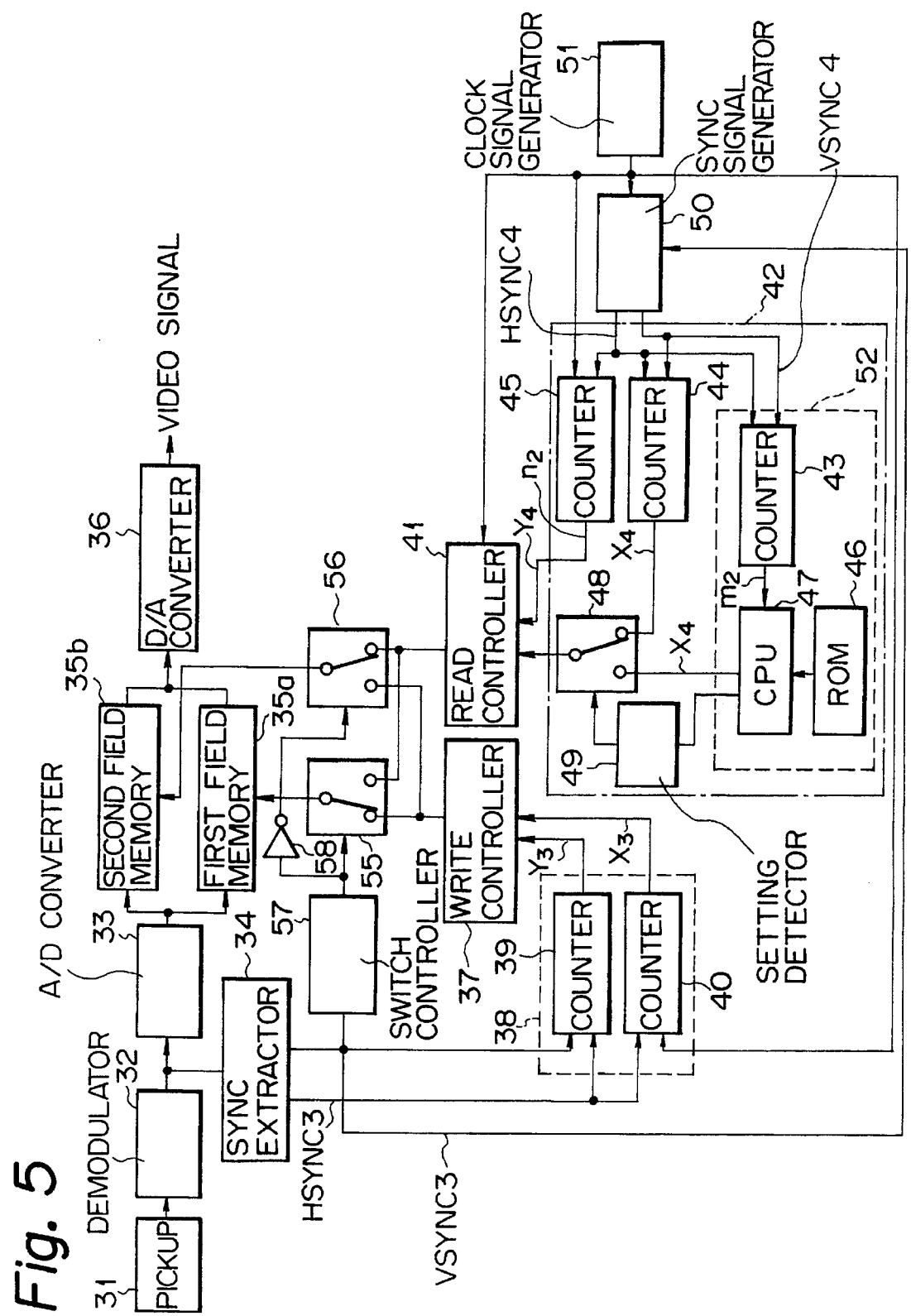
FIG. 5 is a block diagram illustrating a video signal reproducing apparatus embodying the present invention.

FIG. 5 illustrates a video signal reproducing apparatus according to the present invention. In the reproducing apparatus, a pickup 31 optically reads video signals recorded on a disk (not shown). Recorded on the disk are scrambled video signals as mentioned above. The output of the pickup 31 is connected via a video demodulator 32 to an A/D converter 33 and a sync extractor 34. First and second field memories 35a and 35b are connected to the output of the A/D converter 33. The field memories 35a and 35b are so designed that 910 (horizontal direction) ×256 (vertical direction) =232,960 samples, eight bits per sample, can be written in or read from those memories 35a and 35b. A D/A converter 36 is connected to the outputs of the field memories 35a and 35b. The D/A converter 36 outputs reproduced video signals.

The sync extractor 34 extracts horizontal and vertical sync signals HSYNC3 and VSYNC3 from a video signal. The horizontal and vertical sync signals are supplied to a write controller 37 and a write address setting circuit 38. The write controller 37 controls the writing of video data into the first and second field memories 35a and 35b. The write address setting circuit 38 sequentially sets write addresses in the first and second field memories 35a and 35b. The write address setting circuit 38 has two counters 39 and 40. The counter 39 is reset in accordance with the vertical sync signal VSYNC3 from the sync extractor 34 and counts the horizontal sync signal HSYNC3 from the sync extractor 34. The counter 40 is reset in accordance with the horizontal sync signal HSYNC3 from the sync extractor 34 and counts the clock signal from a clock signal generator 51. The count values of the counters 39 and 40 are supplied as a write address to the write controller 37.

Reading of video data from the first and second field memories 35a and 35b is controlled by a read controller 41. The read controller 41 is connected to a read address setting circuit 42 which sequentially sets read addresses to be accessed. The read address setting circuit 42 comprises counters 43, 44 and 45, a ROM 46, a CPU 47, a switch 48 and a memory-pack setting detector 49. The read address setting circuit 42 is connected to a sync signal generator 50. The sync signal generator 50 generates horizontal and vertical sync signals HSYNC4 and VSYNC4 on the basis of a clock signal output from the clock signal generator 51, and receives the vertical sync signal VSYNC3 from the sync extractor 34 as a reset signal at the time the vertical sync signal VSYNC4 is generated. The counters 43 and 44 are reset in accordance with the vertical sync signal VSYNC4 from the sync signal generator 50 and count the horizontal sync signal HSYNC4 from the sync signal generator 50. The counter 45 is reset in accordance with the horizontal sync signal HSYNC4 from the sync signal generator 50 and counts the clock signal from the clock signal generator 51. An address setting program is previously written in the ROM 46. The CPU 47 runs the address setting program, and sets write line addresses in accordance with the count value of the counter 43 and the clock signal during the execution of that program. The count value of the counter 45 becomes a dot address, and the read address consists of the read line address and read dot address.

Figure 6:
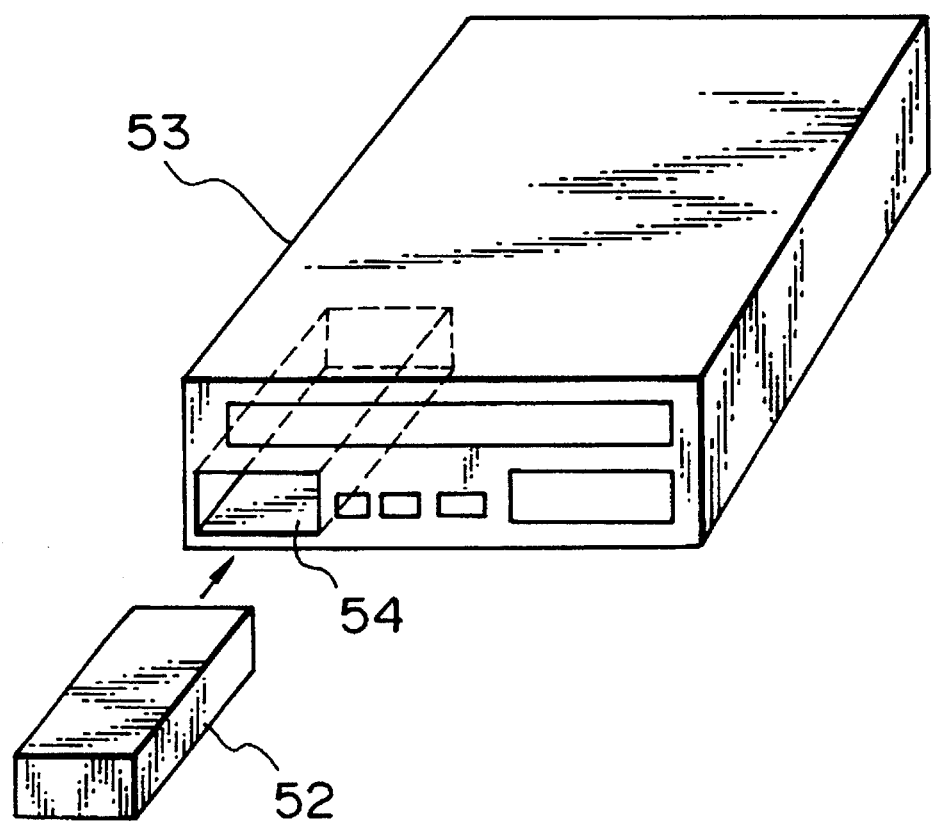
FIG. 6 is a diagram showing a memory pack attachable to and detachable from the housing of the apparatus.

The counter 43, ROM 46 and CPU 47 are formed in one body as a memory pack 52. This memory pack 52 is designed as attachable to and detachable from a housing 53 of the reproducing apparatus as shown in FIG. 6. An insert slot 54 is formed in the operational face of the housing 53. When inserted into the insert slot 54, the memory pack 52 is secured by means (not shown). This memory pack 52 is ejected from the insert slot 54 by the manipulation of an eject key (not shown). The setting detector 49 detects the installation of the memory pack 52 and generates a setting detect signal. The detector 49 may detect the installation of the memory pack 52 mechanically, or may detect it by the reception of a signal from the CPU 47. The switch 48 supplies the count value of the counter 44 as a read line address to the read controller 41 when the setting detect signal is not generated, and supplies the read line address from the CPU 47 to the read controller 41 when the setting detect signal is generated.

One of the first and second field memories 35a and 35b is in write mode for one field period, while the other field memory is in read mode. Accordingly, switches 55 and 56 are provided between the first and second field memories 35a and 35b and the write and read controllers 37 and 41.

The switching of the switches 55 and 56 is controlled by a switch controller 57. The switch controller 57 generates a switch control signal which is inverted every time the vertical sync signal VSYNC3 is supplied from the sync extractor 34. The switch control signal is supplied directly to the switch 55, and via an invertor 58 to the switch 56.

With the above structure, read signals from the disk, which are output by a pickup 31, are demodulated as video signals by a demodulator 32. The video signals from the demodulator 32, which are scrambled signals, are converted directly into digital data in the A/D converter 33, and the digital data is supplied to the first and second field memories 35a and 35b sample by sample. Suppose that individual addresses (X, Y) in the first and second field memories 35a and 35b for 232,960 samples are specified by write addresses ($X_3$, $Y_3$) where X is line addresses 0 to 255 and Y is dot addresses 0 to 909. The switch controller 57 controls the switches 55 and 56 in such a way that in the first field of a video signal, the first field memory 35a is connected via the switch 55 to the write controller 37 and the second field memory 35b is connected via the switch 56 to the read controller 41. In other words, the first field memory 35a is in write mode while the second field memory 35b is in read mode. In the second field of the video signal, the switch controller 57 controls the switches 55 and 56 in such a way that the first field memory 35a is connected via the switch 55 to the read controller 41 and the second field memory 35b is connected via the switch 56 to the write controller 37. In other words, the first field memory 35a is in read mode while the second field memory 35b is in read mode.

In the write address setting circuit 38 which sequentially supplies write addresses ($X_3$, $Y_3$) to the write controller 37 at the timing synchronous with the clock signal, $X_3$ is the value of the counter 39 and $Y_3$ is the count value of the counter 40. In other words, as the count value of the counter 39 changes in the order of 0, 1, 2, . . ., 255 and the count value of the counter 40 changes in the order of 0, 1, 2, . . ., 909, the write addresses ($X_3$, $Y_3$) are set in the order of the addresses in the first and second field memories 35a and 35b, like (0, 0) to (0,909), (1, 0) to (1, 909), (2, 0) to (2, 909) and so forth. In the first field of a video signal, the write controller 37 writes video data at the address positions in the first field memory 35a specified by the write addresses ($X_3$, $Y_3$) at the timing synchronous with the clock signal. Thus, the video data are written in the order of data in the scramble process, like [1, 1] to [1, 910], [172, 1] to [172, 910], [87, 1] to [87,910] and so forth. In the second field of the video signal, like in the first field, the write controller 37 writes video data at the address positions in the second field memory 35b specified by the write addresses ($X_3$, $Y_3$) at the timing synchronous with the clock signal.

The read controller 41 reads video data from the first and second field memories 35a and 35b by a delay of nearly one field period from the writing operation. In the write address setting circuit 42, the values respectively counted in the counters 43 and 44 indicate the line number $m_2$ of each field. The line number $m_2$ takes a value from 1 to 256. The value counted in the counter 45 indicates the dot number $n_2$ of each field. The dot number $n_2$ takes a value from 1 to 910. If the memory pack 52 is set in the housing 53, the setting detector 49 generates a setting detect signal and the switch 48 is changed over to relay the data signal from the CPU 47 to the read controller 41.

Figure 7:
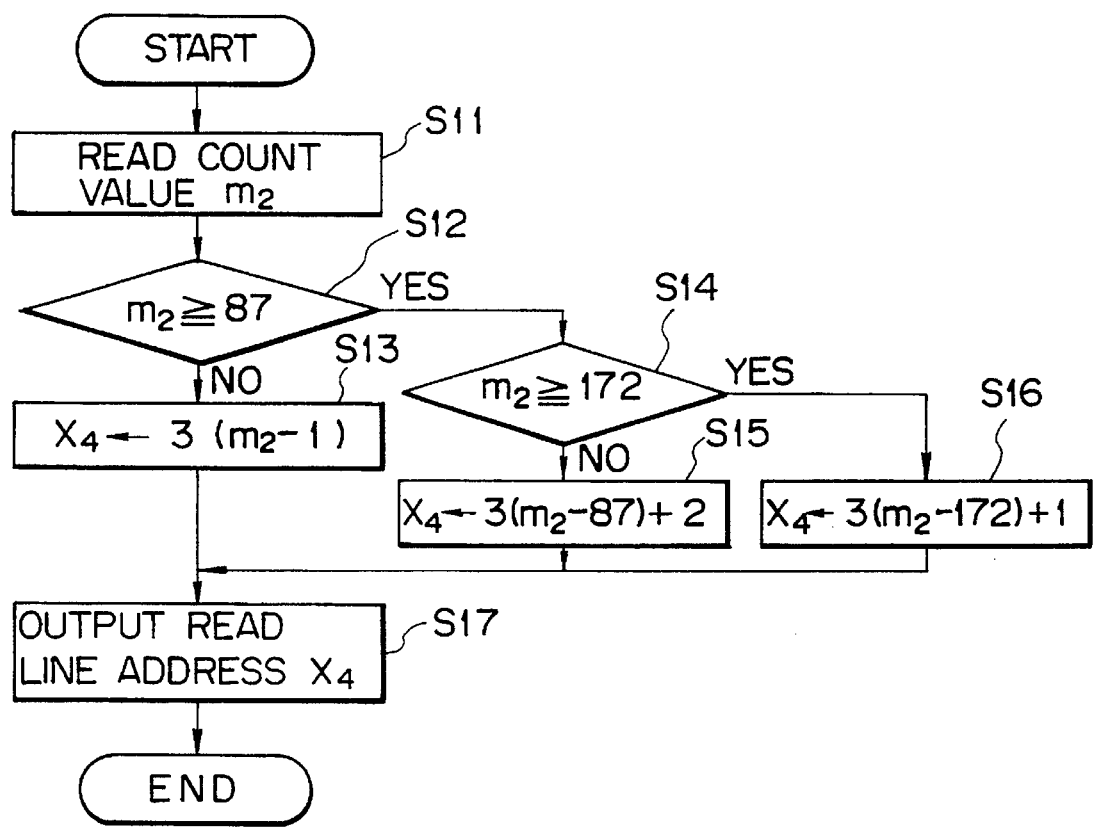
FIG. 7 is a flowchart illustrating the operation of a CPU in the apparatus shown in FIG. 5.

As shown in FIG. 7, the CPU 47 reads the count value $m_2$ of the counter 43 every time the clock signal is generated (step S11), and determines whether or not the count value $m_2$ is equal to or greater than 87 (step S12). When $m_2<87$, the read line address $X_4$ is set equal to 3($m_2$-1) (step S13). When $m_2 \geq 87$, the CPU 47 determines if the count value $m_2$ of the counter 43 is equal to or greater than 172 (step S14). When $m_2<172$, the read line address $X_4$ is set equal to 3($m_2$-87)+2 (step S15). When $m_2 \geq 172$, the read line address $X_4$ is set equal to 3($m_2$-172)+1 (step S16). After the execution of step S13, S15 or S16, the CPU 47 outputs the read line address $X_4$ to the read controller 41 (step S17).

In synchronism with the supply of the read line address $X_4$ to the read controller 41, the count value of the counter 45 is supplied as the read dot address $Y_4$ to the read controller 41. That is, a new read address ($X_4$, $Y_4$) is supplied to the read controller 41 every generation of a clock signal. In the first field of a video signal, the read controller 41 reads video data from the address positions in the first field memory 35a specified by the read addresses ($X_4$, $Y_4$) at the timing synchronous with the clock signal. If video data are written in the first field memory 35a as shown in FIG. 3, the video data [1, 1] to [1, 910] with the line number 1 are sequentially read from the individual address positions in the first field memory 35a specified by the read addresses (0, 0) to (0, 909), and then the video data [2, 1] to [2, 910] with the line number 2 are read from the individual address positions in the first field memory 35a specified by the read addresses (3, 0) to (3, 909). In this manner, the video data are read from every third address row for the line addresses 0 to 255. Then, the video data with the line number 87, [87, 1] to [87, 910], are sequentially read from the individual address positions in the first field memory 35a specified by the write addresses (2, 0) to (2, 909), and the video data [88, 1] to [88, 910] with the line number 88 are sequentially read from the individual address positions in the first field memory 35a specified by the write addresses (5, 0) to (5, 909). In this manner, the video data are read from every third address row for the line addresses 2 to 254. Then, the video data [172, 1] to [172, 910] with the line number 172 are sequentially read from the individual address positions in the first field memory 35a specified by the write addresses (1, 0) to (1, 909), and the video data are likewise read from every third address row for the line addresses 1 to 253. As video data are read out from the first field memory 35a in the order of the line numbers, therefore, the video signals acquired by the D/A conversion of the video data in the D/A converter 36 are the original video signals restored from the scrambled video signals.

In the second field of the video signal, like in the first field, the read controller 41 reads video data from the address positions in the second field memory 35b, specified by the read addresses ($X_4$, $Y_4$), according to the line number at the timing synchronous with the clock signal.

On the other hand, when the memory pack 52 is not set in the housing 53, the setting detector 49 does not generate the setting detect signal, so that the switch 48 is changed over to relay the count value of the counter 44 as the read line address $X_4$ to the read controller 41. As the line address X4 changes in the order of 0, 1, 2, . . ., 255, the read addresses ($X_4$, $Y_4$) are set in the order of the addresses in the first and second field memories 35a and 35b, like (0, 0) to (0, 909), (1, 0) to (1,909), (2, 0) to (2, 909) and so forth.

In the first field of a video signal, the read controller 41 reads video data from the address positions in the first field memory 35a specified by the read addresses ($X_4$, $Y_4$) at the timing synchronous with the clock signal. Thus, the video data are read in the order of data in the scramble process, like [1, 1] to [1, 910], [172, 1] to [172, 910], [87, 1] to [87, 910] and so forth. In the second field of the video signal, like in the first field, the read controller 41 reads video data from the address positions in the second field memory 35b specified by the read addresses $(X_4, Y_4)$ at the timing synchronous with the clock signal. Accordingly, the video signals which are acquired by the D/A conversion of the read video data in the D/A converter 36 remain in the scrambled signal keeping the continuity of the burst signals in the NTSC video signals. The video signals are therefore reproducible but when they are displayed on a display, a scrambled video image will be displayed.

As the address setting program is written in the ROM 46 in the memory pack 52 designed attachable to and detachable from the housing of the reproducing apparatus, the correct video reproduction will not be performed unless a memory pack associated with the recording medium having scrambled data is set in the reproducing apparatus. In this way the security of the video information can be maintained.

Although video data are sequentially read from the field memories 35a and 35b in read mode in an order different from the order of the addresses of the field memories in the above-described embodiment, video data may be sequentially written in an order different from the order of the addresses of the first and second field memories 35a and 35b in write mode and may be read therefrom in the order of the addresses of the field memories 35a and 35b.

Although scrambling is executed in the above-described embodiments in such a way that the order of video data is switched every third line, the scramble system is not limited to this type. As long as the continuity of the burst signals of NTSC video signals is maintained, that scramble system may, of course, be combined with the scramble system which switches the order of video data dot by dot, thus ensuring the switching of the order of video data every fourth line, every fifth line, and so forth.

Figure 8:
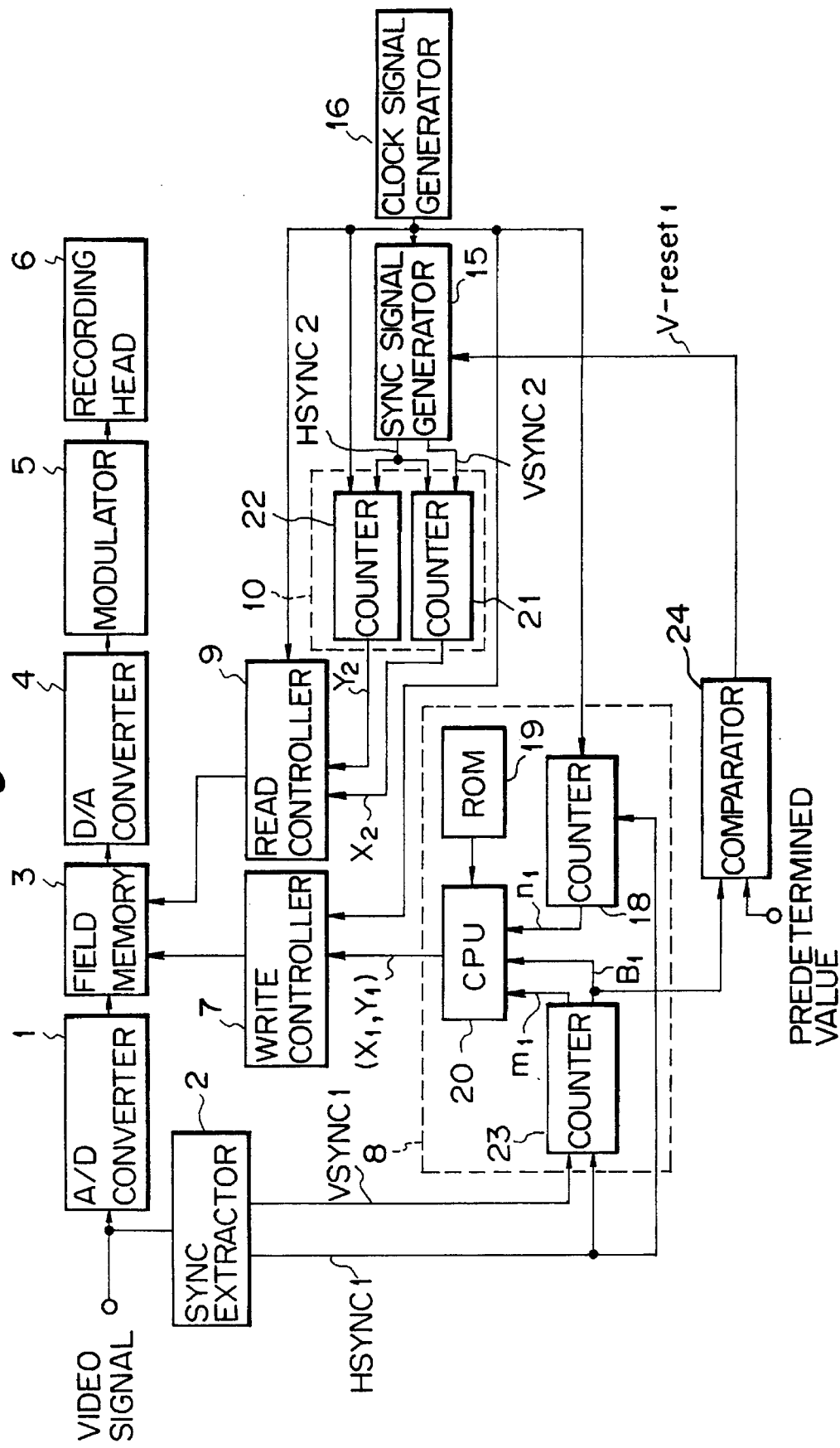
FIG. 8 is a block diagram illustrating a video signal recording apparatus according to another embodiment of the present invention.

FIG. 8 illustrates a video signal recording apparatus according to another embodiment of the present invention. In this video signal recording apparatus, a single field memory 3 is provided. Accordingly, the apparatus shown in FIG. 8 does not have the switches 11 and 12, the switch controller 13 and the invertor 14 which are provided in the apparatus shown in FIG. 1. The field memory 3 is directly connected to the write controller 7 and read controller 9.

The write address setting circuit 8 has a counter 23 in place of the counter 17 provided in the apparatus shown in FIG. 1. The counter 23 is reset in accordance with the vertical sync signal VSYNC1 from the sync extractor 2 and counts the horizontal sync signal HSYNC1 from the sync extractor 2. The counter 23 outputs the count value $m_1$ as a line number to the CPU 20 and outputs a count value $B_1$, which is incremented by "1" every time it counts the horizontal sync signal HSYNC1 nine times, to the CPU 20 as a block number. The initial value of the block number $B_1$ is "1".

Further, a comparator 24 is connected to the output terminal of the counter 23 from which the block number $B_1$ is output. The comparator 24 generates a reset signal V-reset1 when the block number $B_1$ reaches a predetermined value (e.g., 2). The reset signal V-reset1 is supplied to the sync signal generator 15. The sync signal generator 15 generates the horizontal and vertical sync signals HSYNC2 and VSYNC2 on the basis of the clock signal from the clock signal generator 16, and is reset in accordance with the reset signal V-reset1 from the comparator 24. The other structure of the recording apparatus is the same as that of the apparatus shown in FIG. 1.

Figure 9:
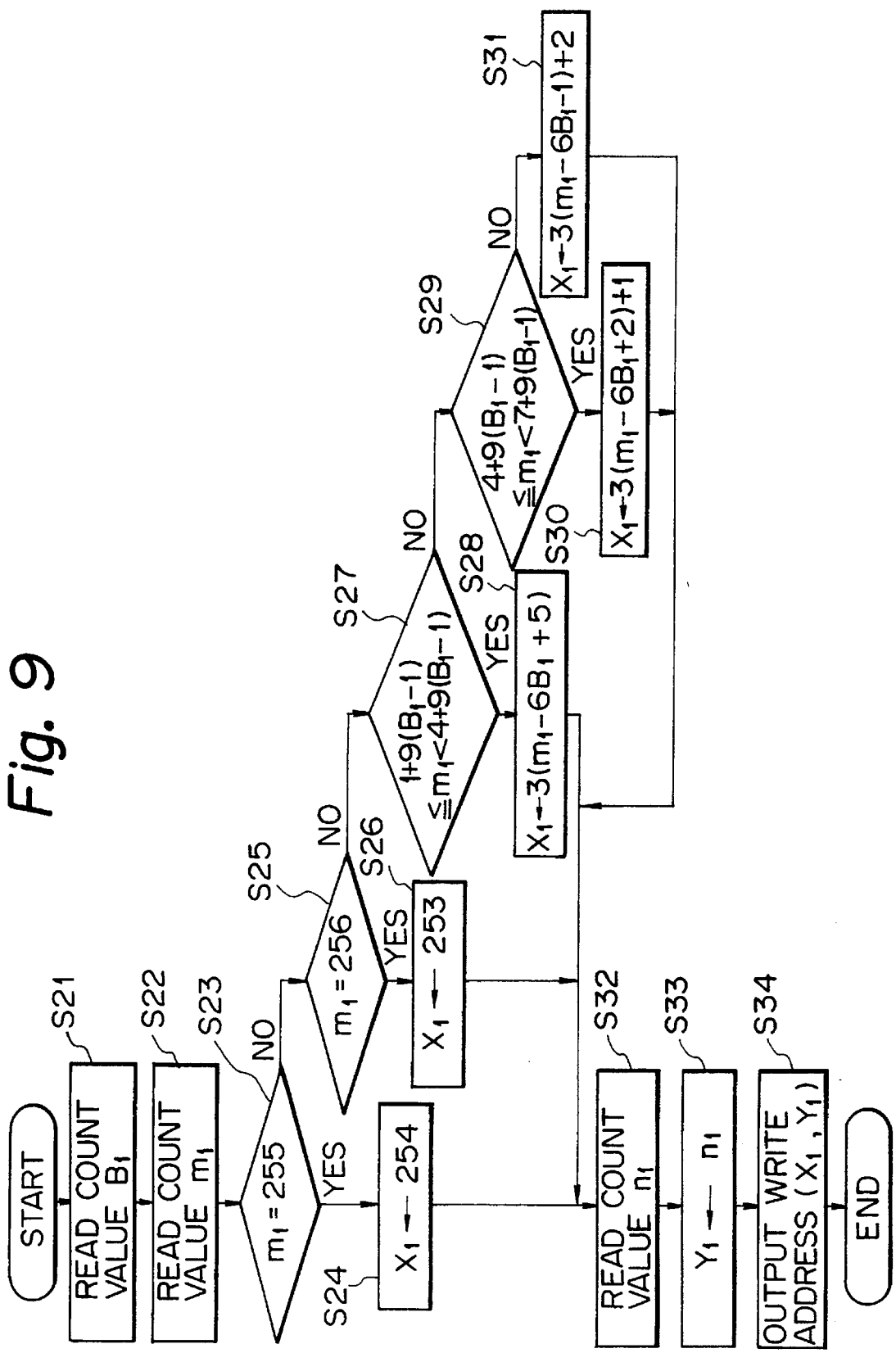
FIG. 9 is a flowchart illustrating the operation of a CPU in the apparatus shown in FIG. 8.

As shown in FIG. 9, the CPU 20 reads the count value $B_1$ and count value $m_1$ of the counter 22 every generation of the clock signal (steps S21 and S22), and determines whether or not the read count value $m_1$ is 255 (step S23). When $m_1=255$, the CPU 20 sets $X_1$ equal to 254 (step S24). When $m_1 \neq 255$, the CPU 20 determines if the read count value $m_1$ is 256 (step S25). When $m_1=256$, the CPU 20 sets $X_1$ equal to 253 (step S26). When $m_1 \neq 256$, the CPU 20 determines whether or not the read count value $m_1$ is equal to or greater than $1+9(B_1-1)$ and is smaller than $4+9(B_1-1)$ (step S27). When $1+9(B_1-1) \leq m_1 < 4+9(B_1-1)$, the CPU 20 sets $X_1$ equal to $3(m_1-6B_1+5)$ (step S28).

If $m_1 < 1+9(B_1-1)$ or $m_1 \geq 4+9(B_1-1)$, the CPU 20 determines whether or not the read count value $m_1$ is equal to or greater than $4+9(B_1-1)$ and is smaller than $7+9(B_1-1)$ (step S29). When $4+9(B_1-1) \leq m_1 < 7+9(B_1-1)$, the CPU 20 sets $X_1$ equal to $3(m_1-6B_1+2)+1$ (step S30). If $m_1 < 4+9(B_1-1)$ or $m_1 \geq 7+9(B_1-1)$, the CPU 20 sets $X_1$ equal to $3(m_1-6B_1-1)+2$ (step S31).

After the execution of step S24, S26, S28, S30 or S31, the CPU 20 reads the count value $n_1$ of the counter 18 (step S32) and sets $Y_1$ equal to that count value $n_1$ (step S33). Then, the CPU 20 outputs a write address $(X_1, Y_1)$ to the write controller 7 (step S34).

In the first field of a video signal, the write controller 7 writes video data at the address positions in the field memory 3 specified by the write addresses $(X_1, Y_1)$ at the timing synchronous with the clock signal. As shown in FIG. 10, the video data [1, 1] to [1,910] with the line number 1 of the block number 1 are written at the individual address positions in the field memory 3 specified by the write addresses (0, 0) to (0, 909). The video data [2, 1] to [2, 910] with the line number 2 are written at the individual address positions in the field memory 3 specified by the write addresses (3, 0) to (3, 909). Then, the video data [3, 1] to [3, 910] with the line number 3 are written at the individual address positions in the field memory 3 specified by the write addresses (6, 0) to (6,909). Up to this point is the same as in the apparatus shown in FIG. 1. As shown in FIG. 10, however, the video data [4, 1] to [4, 910] with the line number 4 are written at the individual address positions in the field memory 3 specified by the write addresses (1, 0) to (1, 909), and the video data are likewise written at every third address row until the line number 6. The video data [7, 1] to [7, 910] with the line number 7 are written at the individual address positions in the field memory 3 specified by the write addresses (2, 0) to (2, 909), and the video data are likewise written at every third address row until the last line number 9 in the block number 1.

The same writing operation is executed for the block numbers 2 to 28. The video data [253, 1] to [253, 910] with the line number 253 in the final block number 29 are written at the individual address positions in the field memory 3 specified by the write addresses (252, 0) to (252, 909). The video data [254, 1] to [254,910] with the line number 254 are written at the individual address positions in the field memory 3 specified by the write addresses (255, 0) to (255, 909). The video data [255, 1] to [255, 910] with the line number 255 are written at the address positions in the field memory 3 specified by the write addresses (254, 0) to (254, 909), and the video data [256, 1] to [256, 910] with the line number 256 are written at the address positions in the field memory 3 specified by the write addresses (253, 0) to (253, 909). In other words, the number of lines for the block number 29 is 4 and the address values through steps S27 to S31 become other than the addresses in the field memory 3, so that steps S23 to S26 are executed to set the address values equal to the addresses in the field memory 3.

In the second field of the video signal, like in the first field, the write controller 7 writes video data at the address positions in the field memory 3 specified by the write addresses ($X_1$, $Y_1$) at the timing synchronous with the clock signal.

The read controller 9 reads video data from the field memory 3 by a delay of about a block period expressed by the aforementioned predetermined value in terms of the number of blocks (e.g., one block period if the predetermined value is 2), from the writing operation. This is because when the count value $B_1$ of the counter 23 equals the predetermined value, the reset signal V-reset1 is supplied to the sync signal generator 15 from the comparator 24, and the sync signal generator 15 generates the horizontal and vertical sync signals HSYNC2 and VSYNC2, thus resetting the counters 21 and 22.

As the count value of the counter 21 changes in the order of 0, 1, 2, . . ., 255 and the count value of the counter 22 changes in the order of 0, 1, 2, . . ., 909 in the read address setting circuit 10, the read addresses ($X_2$, $Y_2$) are set like (0, 0) to (0, 909), (1, 0) to (1,909), (2, 0) to (2, 909), and so forth in the order of the addresses in the field memory 3. In the first field of a video signal, the read controller 9 reads video data from the address positions in the field memory 3 specified by the read addresses ($X_2$, $Y_2$), at the timing synchronous with the clock signal. The video data are therefore read out with a delay of, for example, one block period from the writing, in the order of the addresses, like [1, 1] to [1, 910], [4, 1] to [4, 910], [7, 1] to [7,910], and so forth. In the second field of the video signal, like in the first field, the read controller 9 reads video data from the address positions in the field memory 3 specified by the read addresses ($X_2$, $Y_2$) with a delay of, for example, one block period from the writing, at the timing synchronous with the clock signal.

The video data read in the above manner is converted into analog video signals by the D/A converter 4, and the analog video signals are then supplied to the modulator 5 to become signals to be recorded on the disk as in the apparatus shown in FIG. 1.

Figure 11:
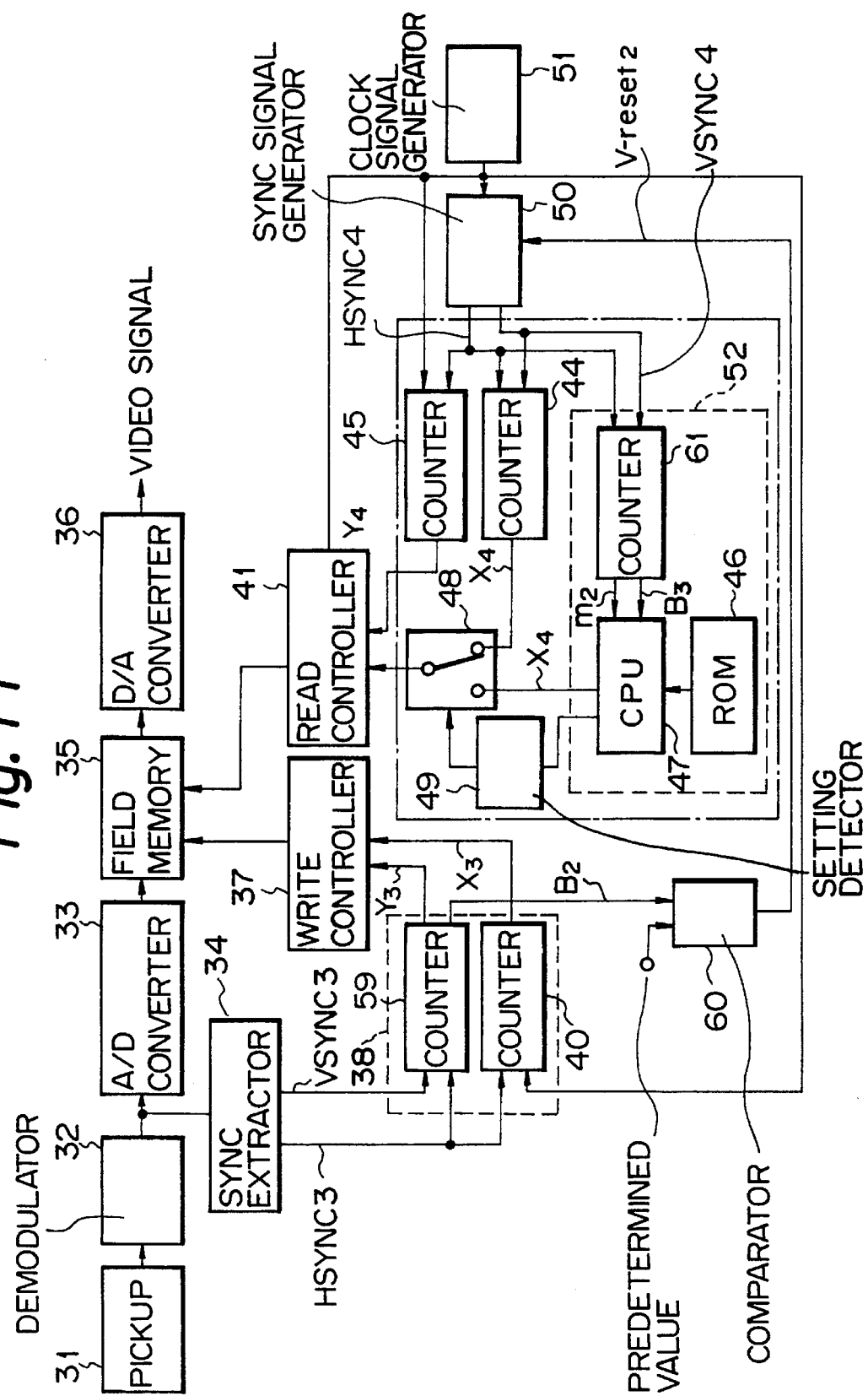
FIG. 11 is a block diagram illustrating a video signal reproducing apparatus according to another embodiment of the present invention.

FIG. 11 illustrates a video signal reproducing apparatus according to another embodiment of the present invention. This video signal reproducing apparatus is associated with the recording apparatus shown in FIG. 8, and has a single field memory 35. Accordingly, this apparatus does not have the switches 55 and 56, the switch controller 57 and the invertor 58 which are provided in the apparatus shown in FIG. 5. The field memory 35 is directly connected to the write controller 37 and read controller 41.

The write address setting circuit 38 has a counter 59 in place of the counter 38 provided in the apparatus shown in FIG. 5. The counter 59 is reset in accordance with the vertical sync signal VSYNC3 from the sync extractor 34 and counts the horizontal sync signal HSYNC3 from the sync extractor 34. The counter 59 outputs the count value $m_2$ as a line number to the write controller 37 and outputs a count value $B_2$, which is incremented by "1" every time it counts the horizontal sync signal HSYNC3 nine times, to a comparator 60 as a block number $B_2$. The initial value of the block number $B_2$ is "1". The comparator 60 generates a reset signal V-reset2 when the block number $B_2$ reaches a predetermined value (e.g., 2). The reset signal V-reset2 is supplied to the sync signal generator 50. The sync signal generator 50 generates the horizontal and vertical sync signals HSYNC4 and VSYNC4 on the basis of the clock signal from the clock signal generator 51, and is reset in accordance with the reset signal V-reset2 from the comparator 60.

The memory pack 52 is provided with a counter 61 in place of the counter 43. The counter 61 is reset in accordance with the vertical sync signal VSYNC4 from the sync signal generator 50 and counts the horizontal sync signal HSYNC4 from the sync signal generator 50. The counter 61 outputs the count value $m_2$ as a line number to the CPU 47 and outputs a count value $B_3$, which is incremented by "1" every time it counts the horizontal sync signal HSYNC4 nine times, to the CPU 47 as a block number $B_3$. The initial value of the block number $B_3$ is "1". The other structure of the reproducing apparatus is the same as that of the apparatus shown in FIG. 5.

With the above structure, the video signals output from the demodulator 32 are converted into digital data in the A/D converter 33, and the digital data is supplied to the field memory 35 sample by sample, so that the individual addresses (X, Y) in the field memory 35 for 232,960 samples are specified by write addresses ($X_3$, $Y_3$). The writing to the field memory 35 is the same as that performed in the apparatus shown in FIG. 5. That is, the write addresses ($X_3$, $Y_3$) are set in the order of the addresses in the field memory 35 like (0, 0) to (0, 909), (1, 0) to (1, 909), (2, 0) to (2, 909) and so forth. In each field of the video signal, the write controller 37 writes video data at the address positions in the field memory 35 specified by the write addresses ($X_3$, $Y_3$) at the timing synchronous with the clock signal. Thus, the video data are written in the order of data in the scramble process, like [1, 1] to [1, 910], [4, 1] to [4, 910], [7, 1] to [7, 910] and so forth.

The read controller 41 reads video data from the field memory 35 by a delay of about a block period expressed by the aforementioned predetermined value in terms of the number of blocks (e.g., one block period if the predetermined value is 2), from the writing operation. This is because, like in the recording apparatus shown in FIG. 8, when the count value $B_2$ of the counter 59 equals the predetermined value, the reset signal V-reset2 is supplied to the sync signal generator 50 from the comparator 60, and the sync signal generator 50 generates the horizontal and vertical sync signals HSYNC4 and VSYNC4, thus resetting the counters 44, 45 and 61.

If the memory pack 52 is inserted in the housing 53, the setting detector 49 generates a setting detect signal and the switch 48 is changed over to relay the data signal from the CPU 47 to the read controller 41.

Figure 12:
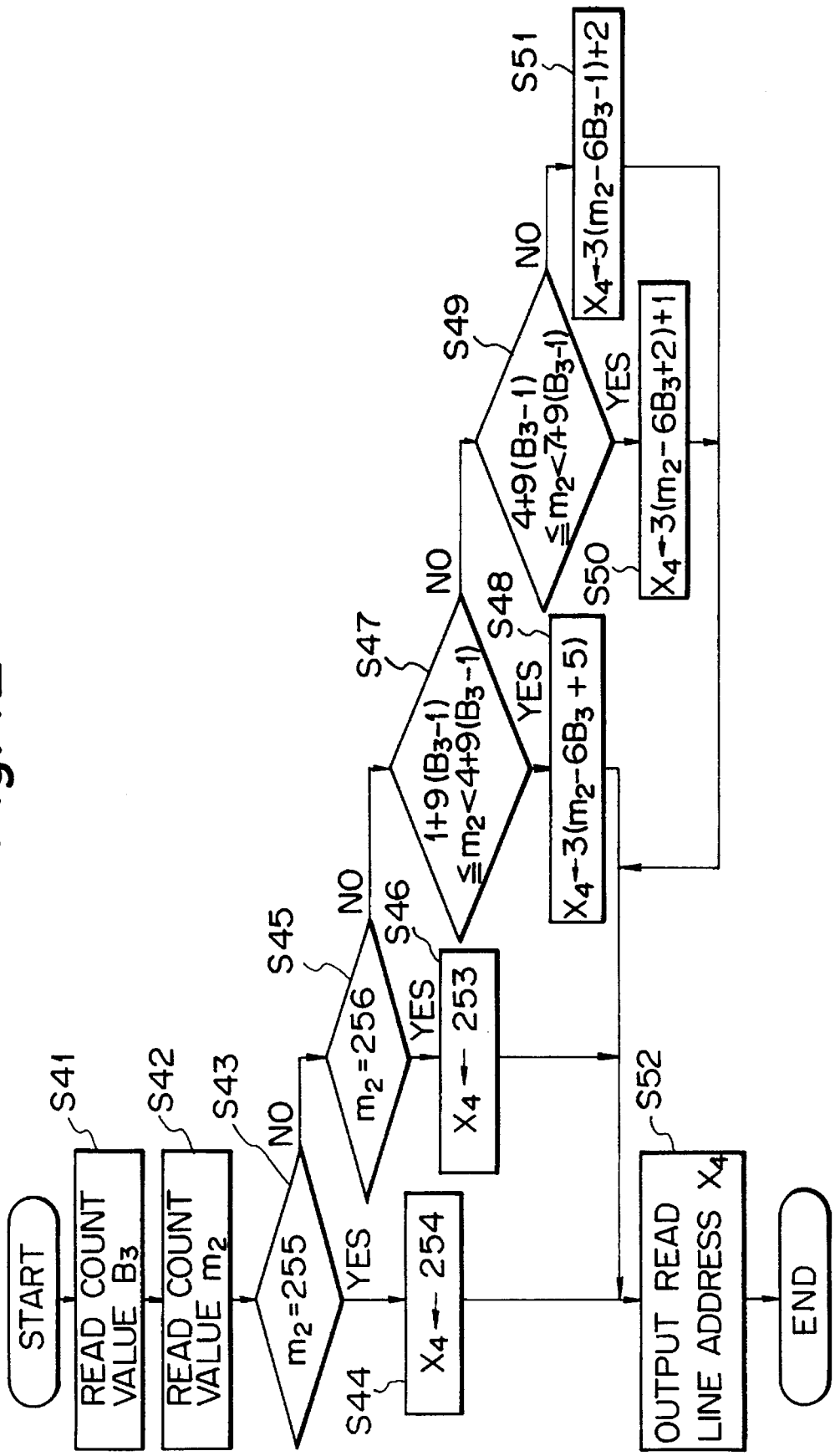
FIG. 12 is a flowchart illustrating the operation of a CPU in the apparatus shown in FIG. 11.

As shown in FIG. 12, the CPU 47 reads the count value $B_3$ and count value $m_2$ of the counter 61 every generation of the clock signal (steps S41 and S42), and determines whether or not the read count value $m_2$ is 255 (step S43). When $m_2=255$, the CPU 47 sets the read line address $X_4$ equal to 254 (step S44). When $m_2 \neq 255$, the CPU 47 determines if the count value $m_2$ of the counter 61 is 256 (step S45). When $m_2=256$, the CPU 47 sets the read line address $X_4$ equal to 253 (step S46). When $m_2 \neq 256$, the CPU 47 determines whether or not the read count value $m_2$ is equal to or greater than $1+9(B_3-1)$ and is smaller than $4+9(B_3-1)$ (step S47).

When $1+9(B_3-1) \leq m_2 < 4+9(B_3-1)$, the CPU 47 sets the read line address $X_4$ equal to $3(m_2-6B_3+5)$ (step S48). If $m_2<1+9(B_3-1)$ or $m_2 24\ 4+9(B_3-1)$, the CPU 47 determines whether or not the read count value $m_2$ is equal to or greater than $4+9(B_3-1)$ and is smaller than $7+9(B_3-1)$ (step S49). When $4+9(B_3-1) \leq m_2 < 7+9(B_3-1)$, the CPU 47 sets the read line address $X_4$ equal to $3(m_2-6B_3+2)+1$ (step S50). If $m_2<4+9(B_3-1)$ or $m_2 \geq 7+9(B_3-1)$, the CPU 47 sets the read line address $X_4$ equal to $3(m_2-6B_3-1)+2$ (step S51). After the execution of step S44, S46, S48, S50 or S51, the CPU 47 reads the read line address $X_4$ and outputs it to the read controller 41 (step S52).

In synchronous with the supply of the read line address $X_4$ to the read controller 41, the count value of the counter 45 is supplied to the read controller 41 as the read dot address $Y_4$. In each field of a video signal, the read controller 41 reads video data from the address positions in the field memory 35 specified by the read addresses $(X_4, Y_4)$ at the timing synchronous with the clock signal. If video data is written in the field memory 35 as shown in FIG. 10, the video data [1, 1] to [1, 910] with the line number 1 of the block number 1 are sequentially read from the individual address positions in the field memory 35 specified by the read addresses (0, 0) to (0, 909). Then, the video data [2, 1] to [2, 910] with the line number 2 are sequentially read from the individual address positions in the field memory 35 specified by the read addresses (3, 0) to (3, 909). Then, the video data [3, 1] to [3, 910] with the line number 3 are sequentially read from the individual address positions in the field memory 35 specified by the read addresses (6, 0) to (6, 909). Further, the video data [4, 1] to [4,910] with the line number 4 are sequentially read from the individual address positions in the field memory 35 specified by the read addresses (1, 0) to (1, 909), and the video data are likewise read from every third address row until the line number 6. The video data [7, 1] to [7,910] with the line number 7 are read from the individual address positions in the field memory 35 specified by the read addresses (2, 0) to (2, 909), and the video data are likewise read from every third address row until the last line number 9 in the block number 1.

The same reading operation is executed for the block numbers 2 to 28. The video data [253, 1] to [253, 910] with the line number 253 in the final block number 29 are read from the individual address positions in the field memory 35 specified by the read addresses (252, 0) to (252, 909). The video data [254, 1] to [254, 910] with the line number 254 are read from the individual address positions in the field memory 35 specified by the read addresses (255, 0) to (255, 909). The video data [255, 1] to [255, 910] with the line number 255 are read from the address positions in the field memory 35 specified by the read addresses (254, 0) to (254,909), and the video data [256, 1] to [256,910] with the line number 256 are read from the address positions in the field memory 35 specified by the read addresses (253, 0) to (253, 909). For the block number 29, therefore, steps S43 to S46 are executed in the above manner to set the address values equal to the addresses in the field memory 35.

Since the video data are read out from the field memory 35 in the order of line numbers, the video signals acquired by the D/A conversion of the video data in the D/A converter 36 become the original video signals restored from the scrambled video signals.

When the memory pack 52 is not inserted in the housing 53, on the other hand, the setting detector 49 does not generate the setting detect signal, so that the switch 48 is changed over to relay the count value of the counter 44 as the read line address $X_4$ to the read controller 41. Since the line address $X_4$ changes in the order of 0, 1, 2, ..., 255, the video data are read from the address positions in the field memory 35 specified by the read addresses $(X_4, Y_4)$, in the order of data in the scramble process, like [1, 1] to [1, 910], [4, 1] to [4,910], [7, 1] to [7, 910] and so forth. Thus, the reproduced video signals which have been read in this manner are reproducible, but when they are displayed on a display, a scrambled video image will be displayed.

Although one block consists of nine lines in the above-described recording and reproducing apparatuses according to the second embodiment, the number of lines is not limited to the value. One block may consist of eight lines or ten lines.

In short, according to the video signal recording apparatus of the present invention, video signals are digitized, are written in the memory and are then read therefrom before being recorded on a recording medium, and the orders of access to the addresses in the memory in write and read modes differ from each other with a predetermined relationship. Accordingly, the conventional reproducing apparatus cannot correctly reproduce recorded video images from the recording medium on which video signals are recorded in this manner. The apparatus is therefore effective in the case where the reproduction of arbitrary video images is not desired.

According to the video signal reproducing apparatus of the present invention, after recorded signals are read from a recording medium, yielding video signals, the video signals are digitized, are written in the memory and are then read therefrom, and the orders of access to the addresses in the memory in write and read modes differ from each other with a predetermined relationship. Accordingly, the reproducing apparatus can correctly reproduce recorded video images from the recording medium on which video signals have been recorded by the recording apparatus of the present invention.

What is claimed is:

1. A video signal reproducing apparatus comprising:

read means for reading recorded signals carrying video signals from a recording medium;

signal generating means for generating digital video signals in accordance with said read recorded signals;

a first memory having a capacity for storing at least one field of digital video signals;

a second memory having a capacity for storing at least one field of digital video signals; and write/read control means for writing produced digital video signals into one of said first memory and said second memory, and for reading written digital video signals from one of said first memory and said second memory, wherein an order of access of said write/read control means to addresses in one of said first memory and said second memory in a write mode and an order of access of said write/read control means to addresses of said one of said first memory and said second memory in a read mode differ from each other in accordance with a predetermined relationship, and wherein said write/read control means comprises:

a write address setting circuit;

a write controller;

a read address setting circuit;

a read controller;

a first switch selectively connected to one of said write controller and said read controller and to said first memory;

a second switch selectively connected to one of said write controller and said read controller and to said second memory; and a switch controller, connected to said first switch and said second switch, for controlling respective connections of said first switch and said second switch.

2. A video signal recording apparatus comprising:

a first memory having a capacity for storing at least one field of digital video signals;

a second memory having a capacity for storing at least one field of digital video signals;

write/read control means for writing digital video signals into one of said first memory and said second memory, and reading written digital video signals from the other one of said first memory and said second memory, wherein digital video data corresponding to a field of said video signals is written into one of said first memory and said second memory, while digital video data corresponding to another field of said digital video signals is simultaneously read from the other one of said first memory and said second memory; and recording means for recording signals corresponding to read digital video signals, on a recording medium, wherein an order of access of said write/read control means to addresses in one of said first memory and said second memory in a write mode and an order of access of said write/read control means to addresses in said one of said first memory and said second memory in a read mode differ from each other in accordance with any predetermined relationship which maintains continuity of burst signals in said digital video signals, and wherein said write/read control means comprises;

a write address setting circuit;

a write controller;

a read address setting circuit;

a read controller;

a first switch selectively connected to one of said write controller and said read controller and to said first memory;

a second switch selectively connected to one of said write controller and said read controller and to said second memory; and a switch controller, connected to said first switch and said second switch, for controlling respective connections of said first switch and said second switch.

* * * * *